United States Patent [19]

Salzmann

[11] Patent Number: 5,655,666

[45] Date of Patent: Aug. 12, 1997

[54] SIEVE

[76] Inventor: Manfred Salzmann, Loher Strasse 19, 58511 Lüdenscheid, Germany

[21] Appl. No.: 612,852

[22] PCT Filed: Sep. 7, 1994

[86] PCT No.: PCT/EP94/02995

§ 371 Date: Feb. 26, 1996

§ 102(e) Date: Feb. 26, 1996

[87] PCT Pub. No.: WO95/07647

PCT Pub. Date: Mar. 23, 1995

[30] Foreign Application Priority Data

Sep. 15, 1993 [FR] France ............ 93 13 931.4 U

[51] Int. Cl.⁶ .................................................. B07B 1/49
[52] U.S. Cl. ..................................... 209/403; 209/412
[58] Field of Search ..................... 209/398, 399, 209/400, 402, 403, 405, 407, 411, 412

[56] References Cited

U.S. PATENT DOCUMENTS

| 221,322 | 11/1879 | Kennedy | 209/403 |
| 3,406,823 | 10/1968 | Crain | 209/403 X |
| 3,800,943 | 4/1974 | Riesbeck et al. | 209/403 X |
| 3,875,065 | 4/1975 | Rosenblum | 209/403 X |
| 3,888,765 | 6/1975 | Bolk | 209/403 X |
| 4,096,058 | 6/1978 | Borie | 209/403 |
| 4,929,346 | 5/1990 | Si-Lin | 209/403 X |

FOREIGN PATENT DOCUMENTS

| 44803 | 3/1909 | Austria . | |
| 0088028 | 9/1983 | European Pat. Off. . | |
| 80613 | 6/1894 | Germany | 209/403 |
| 220227 | 3/1909 | Germany | 209/403 |
| 1056460 | 4/1959 | Germany | 209/403 |
| 1897241 | 7/1964 | Germany . | |
| 3907777 | 9/1990 | Germany . | |
| 9115840 | 2/1992 | Germany . | |
| 141954 | 4/1920 | United Kingdom | 209/403 |
| 2059807 | 4/1981 | United Kingdom . | |

Primary Examiner—D. Glenn Dayoan
Attorney, Agent, or Firm—Edwin D. Schindler

[57] ABSTRACT

A sieve has a fine wire mesh retained by a ring and two annular casings detachably linked to each other by clamping elements for clamping the wire mesh. The edge of the flat wire mesh is firmly secured to a wire ring. The first annular casing ends in a rounded end flange and the second annular casing surrounds the rounded end flange with a radial annular step for clamping of the wire ring. The wire mesh may be gently mounted into, and out of, the sieve so that the wire mesh is not damaged.

8 Claims, 1 Drawing Sheet

SIEVE

TECHNICAL FIELD OF THE INVENTION

The invention relates to a sieve comprising a fine wire mesh (3) securely connected to a wire ring (8) and two annular casings (1, 2) detachably connected to one another by means of clamping elements (5) and securely clamping the wire mesh and the wire ring.

The field of application of the invention concerns strainers for culinary purposes.

PRIOR ART

A sieve of the generic type is described in DE-U-91 15 840. The wire mesh must be removed after each use for purposes of cleaning. This is vital in the catering trade for reasons of food hygiene. In this sieve, the wire mesh can easily be damaged when it is drawn over the end edge and squeezed in the gap, and as a result of this it may become unusable prematurely.

DE-A1-39 07 777 furthermore describes a sieve, where the first annular casing terminates in an end flange and the second annular casing has a radial annular step which reaches over the end flange. The sieve part, which is constructed as a metal disc, is clamped at its edge between the end casing and the annular step. This type of attachment is unsuitable for a sieve part comprising a wire mesh.

SUMMARY OF THE INVENTION

The object of the invention is a construction of the sieve such that the wire mesh may be assembled and disassembled carefully, so that the risk of damage thereto is eliminated.

This object is achieved according to the invention in that the wire mesh (7) is planar and the wire ring (8) is placed on one face of the wire mesh (7), in that the first annular casing (1) terminates in a rounded end flange (3), in that the wire ring (8) reaches over the outer edge of the end flange (3) and in that the second annular casing (2) has a rim (5), aligned in the axial direction, of a radial annular step (4) which reaches over the end flange (3) and the wire ring (8).

The invention differs from the prior art in that the wire mesh is planar and is placed between the end flange and the annular step. When the annular casings are placed together, sliding movements with regard to the face of the wire mesh do not occur. The wire ring centers the wire mesh perfectly. Assembly and disassembly of the sieve for the necessary cleaning after each use do not shorten the service life of the wire mesh.

So that edges of the end flange cannot damage the wire mesh, the invention also provides for the end flange to have a cross section in the shape of a quarter circle.

A flush and careful mounting of the wire mesh is ensured in that the annular step is offset at a right angle from the second annular casing and butts onto the end flange.

A long-lasting material connection is achieved in that the wire ring is connected to the wire mesh by means of a welded connection.

Particular ease of operation is achieved in that the clamping elements are constructed as clamping levers.

SHORT DESCRIPTION OF THE DRAWING

An example embodiment of the invention is explained below with reference to the drawing. In the drawing.

EXAMPLE EMBODIMENT

Figure 1:
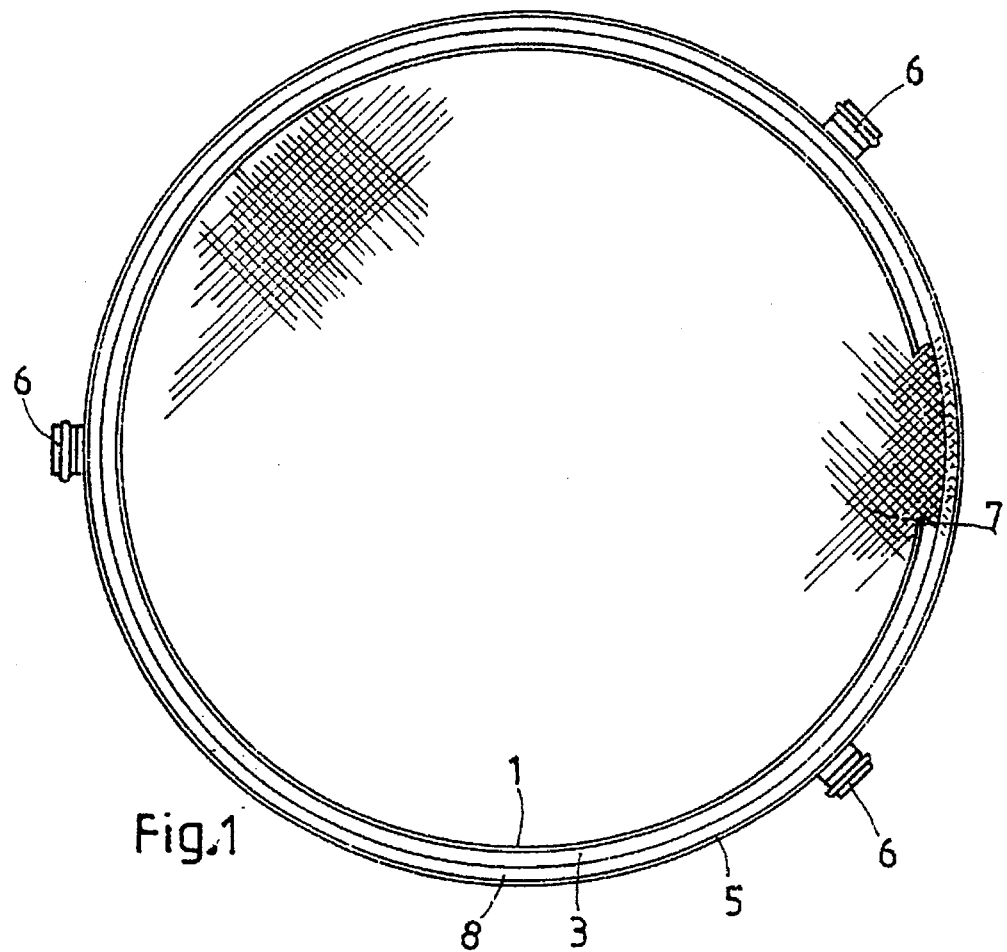
FIG. 1 shows a view from below.
Figure 2:
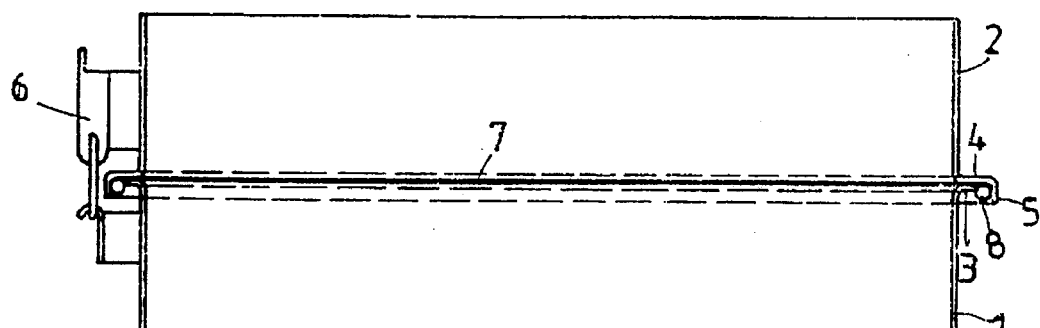
FIG. 2 shows a section through the sieve.

A first annular casing 1 and a second annular casing 2 both have the same internal diameter. The first annular casing 1 terminates in an end flange 3 having a cross section in the shape of a quarter circle, whereof the edge delimits a planar end face.

The second annular casing 2 has an annular step 4, bent off at a right angle, which is opposite the end flange 3. An axially aligned rim 5 adjoins the annular step 4, the internal diameter of the rim 5 being greater than the external diameter of the outer edge of the annular flange 3, so that a gap remains between the outer edge of the annular flange 3 and the axial rim 5.

Clamping elements 6, preferably in the form of clamping levers, are mounted on the annular casings 1 and 2, enabling the annular casings to be placed together axially.

The outer edge of a planar wire mesh 7 in the form of a circular disc is positioned on a wire ring 8 and connected materially thereto by means of a welded connection.

All parts of the sieve are made of special steel or another material which is permitted by legal provisions relating to food and which meets hygiene standards.

For the construction of the sieve, the wire mesh 7 is placed on the end flange 3 of the first annular casing 1, the wire ring 8 reaching over the edge of the end flange 3. In this arrangement, the end flange 3 does not constitute a load on the wire mesh 7. The second annular casing 2 is then arranged thereabove. The annular step 4 lies on the edge of the wire mesh 7. The axial edge 5 reaches over the wire ring 8, likewise without adversely affecting the wire mesh 7. The two annular casings and the wire mesh are thus centered exactly within one another. Finally, the clamping elements 6 are tightened. The wire mesh is thereby securely fixed between the end edge 3 and the annular step 4. The wire ring 8 centers the wire mesh exactly. The funnel-like curvature of the end flange 3 eliminates any risk of damage to the wire mesh. A long service life of the wire mesh is thereby ensured.

After each use of the sieve, the parts are dismantled to enable cleaning. Cleaning and assembly of the parts are very gentle. The wire mesh may be replaced at any time by a replacement mesh, if it is worn or damaged in the course of proper use. The wire mesh may be exchanged at any time for a wire mesh of a different sieve mesh size.

The sieve is suitable in particular for preparing stuffings, sauces and for other straining applications. As a result of the exchangeable wire mesh, the sieve is very economical. This is because the annular casings, which have a high durability, may be used with practically no restrictions. It meets all hygiene requirements in excellent manner.

I claim:

1. A sieve, comprising:

a wire ring;

a fine wire mesh being planar and securely connected to said wire ring, with said wire ring being placed being placed on one face of said fine wire mesh; and, a first annular casing and a second annular casing detachably connected to one another via clamping elements and securely clamping said fine wire mesh and said wire ring, wherein said first annular casing terminates in a rounded end flange with said wire ring reaching over an outer edge of said rounded end flange, and said second annular casing having a radial annular step with an axially aligned rim adjoining said radial annular step which reaches over said rounded end flange and said wire ring, said rounded end flange having a cross-section in a shape of a quarter-circle.

2. The sieve according to claim 1, wherein said radial annular step is arranged at a right angle from said second annular casing and abuts onto said rounded end flange.

3. The sieve according to claim 1, wherein said wire ring is connected to said fine wire mesh via a welded connection.

4. The sieve according to claim 1, wherein said clamping elements are clamping levers.

5. A sieve, comprising:

a wire ring;

a fine wire mesh being planar and securely connected to said wire ring, with said wire ring being placed being placed on one face of said fine wire mesh; and, a first annular casing and a second annular casing detachably connected to one another via clamping elements and securely clamping said fine wire mesh and said wire ring, wherein said first annular casing terminates in a rounded end flange with said wire ring reaching over an outer edge of said rounded end flange, and said second annular casing having a radial annular step with an axially aligned rim adjoining said radial annular step which reaches over the rounded end flange and said wire ring, said radial annular step being arranged at a right angle from said second annular casing and abutting onto said rounded end flange.

6. The sieve according to claim 5, wherein said rounded end flange has a cross-section in a shape of a quarter-circle.

7. The sieve according to claim 5, wherein said wire ring is connected to said fine wire mesh via a welded connection.

8. The sieve according to claim 5, wherein said clamping elements are clamping levers.

* * * * *